(12) United States Patent
Weatherspoon (10) Patent No.: US 7,392,330 B2
(45) Date of Patent: Jun. 24, 2008

(54) MEMORY ACCESS BANDWIDTH ALLOCATION AND LATENCY CONTROL IN A DIGITAL CAMERA

(75) Inventor: Darryl G. Weatherspoon, Oakland, CA (US)

(73) Assignee: Mediatek USA Inc., San Jose, CA (US)

( * ) Notice: Subject to any disclaimer, the term of this patent is extended or adjusted under 35 U.S.C. 154(b) by 822 days.

(21) Appl. No.: 10/884,081

(22) Filed: Jul. 2, 2004

(65) Prior Publication Data

US 2006/0004931 A1    Jan. 5, 2006

(51) Int. Cl.
*G06F 13/28* (2006.01)

(52) U.S. Cl. .......................... 710/22; 358/906; 382/299; 396/297; 396/310; 396/322

(58) Field of Classification Search ............... 710/22
See application file for complete search history.

(56) References Cited

U.S. PATENT DOCUMENTS

| | | | | |
|---|---|---|---|---|
| 5,761,417 A * | 6/1998 | Henley et al. | ............ | 709/231 |
| 5,983,301 A * | 11/1999 | Baker et al. | ............ | 710/113 |
| 6,028,807 A | 2/2000 | Awsienko | ............ | 365/230.02 |
| 6,115,799 A | 9/2000 | Ogawa | ............ | 711/171 |
| 6,122,007 A | 9/2000 | Ishibashi | ............ | 348/231.6 |
| 6,192,428 B1 * | 2/2001 | Abramson et al. | ............ | 710/52 |
| 6,212,331 B1 | 4/2001 | Fukuoka et al. | ............ | 386/117 |
| 6,215,462 B1 | 4/2001 | Yamada et al. | ............ | 345/76 |
| 6,279,052 B1 * | 8/2001 | Upadrastra | ............ | 710/22 |
| 6,296,187 B1 | 10/2001 | Shearer | ............ | 235/462.41 |
| 6,970,182 B1 | 11/2005 | Schultz et al. | ............ | 348/86 |
| 7,110,613 B2 | 9/2006 | Muramatsu et al. | ............ | 382/280 |
| 7,196,729 B2 | 3/2007 | Sasaki | ............ | 348/345 |
| 7,225,278 B1 * | 5/2007 | Baxter et al. | ............ | 710/22 |
| 2003/0160885 A1 | 8/2003 | Sasaki | ............ | 348/345 |
| 2003/0206666 A1 * | 11/2003 | Kosugi et al. | ............ | 382/299 |
| 2004/0225759 A1 * | 11/2004 | Kohashi | ............ | 710/22 |
| 2005/0216613 A1 * | 9/2005 | Ganapathy et al. | ............ | 710/22 |
| 2006/0064517 A1 | 3/2006 | Oliver | ............ | 710/22 |

\* cited by examiner

*Primary Examiner*—Niketa I. Patel
(74) *Attorney, Agent, or Firm*—Imperium Patent Works LLP; T. Lester Wallace; Zheng Jin (57) ABSTRACT

Memory access bandwidth within a digital camera is allocated among several requestors by assigning each requester a "tokens per snapshot" (TPS) value. Each requestor has a DMA engine and a DMA entry queue. If the requester wishes to access the memory, then a DMA entry is pushed onto the DMA entry queue of the requester. An arbiter uses the TPS values to select DMA entries off the various queues for incorporation into a "snapshot". The arbiter then selects DMA entries from the snapshot in an order for servicing such that memory access overhead in accessing the memory is reduced. Only after all DMA entries of the snapshot have been serviced is another snapshot of entries selected. Maximum latency in servicing a queue is controlled by assigning each queue a time out value (TOV). If a queue times out, then that queue is moved up in the order of servicing.

24 Claims, 5 Drawing Sheets

MEMORY ACCESS BANDWIDTH ALLOCATION AND LATENCY CONTROL IN A DIGITAL CAMERA

TECHNICAL FIELD

The present invention relates to a digital camera that has a plurality of functional parts that require access to a memory that has a limited memory access bandwidth.

BACKGROUND

Conventional consumer market digital cameras typically involve image processing circuitry as well as a separate memory integrated circuit. The memory integrated circuit may, for example, be a synchronous dynamic random access memory (SDRAM).

Images are captured by an image sensor. The image sensor outputs a stream of raw image information that is stored into the memory. In the case of video or a rapid sequence of still images, the flow of image information can be a fairly constant stream. At the same time that raw image information later in the stream is being stored into the memory, image information earlier in the stream is being read out of the memory for image processing by a digital image pipeline (DIP). The digital image pipeline may include several processing blocks. A first image processing block may be operating on a first part of the image stream, whereas a second image processing block is operating on a second part of the image stream. Each block may read image information from the memory, perform processing, and then write the resulting processed information back out to the memory. Several blocks of the digital image pipeline may therefore attempt to access the memory at the same time.

Not only can different blocks of the digital image pipeline require access to the memory, but there may be other blocks of functionality on the digital camera that require memory access as well. In one example, the digital camera includes a JPEG compression block. The JPEG compression block reads an image out of the memory, compresses the image, and then outputs a compressed version of the image and stores the compressed version back to the memory. The digital camera typically has a zoom engine that reads an image out of the memory, creates a smaller version of the image called a "thumbnail," and then writes this thumbnail back to the memory. The digital camera typically has a display that the user can use to view the image about to be captured. The thumbnail may be read out from memory and may be supplied to the display for viewing. The digital camera may also have the ability to overlay an icon or text information over an image. An on-screen display (OSD) engine may read a background image out of the memory, superimpose the icon or text or other visual feature on top of the background image, and then write the composite image back out to memory for viewing on the camera's display. A camera may also include a video encoder/decoder such as, for example, an MPEG2 codec. Image information may be read out of memory and sent through the MPEG2 codec. The resulting MPEG2 stream output by the MPEG2 codec may then be returned to memory.

The memory integrated circuit typically has a single access port that is used to write information into the memory and that is used to read information out of the memory. Due to the multiple different entities that need to read image information out of the memory integrated circuit, and the need to write image information into the memory integrated circuit, the access port of the memory integrated circuit is often times a throughput bottleneck in the camera. There is a limited amount of data that can be moved across the access port per unit time. In order for the camera to operate properly, the total amount of data to be moved either into or out of the memory by each of the accessing entities must total to a number less than the maximum memory access bandwidth of the memory integrated circuit.

Not only must the total memory access bandwidth required by all the accessing entities be less than the available memory access bandwidth available over the long term, but each of the accessing entities must not be made to wait too long to access the memory. The amount of time it takes to access the memory is sometimes referred to latency. If an accessing entity is made to wait too long, then operation of that entity may fail or be slowed or halted, thereby decreasing overall throughput of the camera. Some accessing entities may not be able to accommodate as much latency as other entities. The flow of video image information from the image sensor into the memory is one such process that typically can only tolerate a low amount of latency. If raw video image information being output from the image sensor cannot be stored within a certain amount of time, then it may be overwritten thereby resulting in the loss of raw image information. Other accessing entities, in contrast, can generally wait to access memory as long as over the long term those entities receive their required amount of access to the memory.

In one conventional digital camera, the total memory access bandwidth and latency issues are handled using an arbiter. Each of the accessing entities has its own dedicated DMA engine or engines. Within each accessing entity there may be sub-entities that access memory. When one of the accessing entities needs to access the memory, its DMA engine makes a request to the arbiter. If there is only one DMA engine making a request, then the request is granted and the accessing entity gains access to the memory. If there are multiple DMA engines making simultaneous requests, then one of the DMA engines is selected based on a strict priority or round robin arbitration scheme. If, for example, the DMA engine that moves raw image data from the image sensor into the memory is making a request at the same time that the zoom engine's DMA engine is making a request, then the DMA engine for the raw image data will typically have its request granted and the zoom engine's DMA engine will typically have to wait. To prevent latency problems, the system is designed so that so many high priority requests cannot be submitted in such a short period of time that the latency and bandwidth requirements of the lowest priority DMA engines are violated. Controlling when DMA engines can make requests and making sure that latency and throughput requirements of each of the requesting entities are not violated can give rise to difficult system design issues. If the system is changed, for example, then timing of the various DMA engines and the timing of their requests can change in complex ways. Reanalysis of the interplay between the various processing blocks of the system may be required. Flow shaping and scheduling are employed in the design of routers and switches in the networking and the telecommunications arts to handle bandwidth and latency issues. These techniques are, however, generally complex and tend to be expensive and cumbersome to implement. An inexpensive solution is desired that is suitable for use in a price-sensitive consumer market digital camera.

SUMMARY

A memory (for example, a synchronous dynamic read only memory—SDRAM) of a digital camera stores image information and has a single access port. Image information is both read out of the memory, and is written into the memory across this single access port. Memory access bandwidth on this access port is allocated among several requesters of the image information by assigning each requestor a "tokens per snapshot" (TPS) value. The tokens per snapshot value may, for example, be a number that indicates a number of DMA request entries. Each of the requesters has a DMA engine and a DMA request entry queue. If the requester wishes to access the memory, then a DMA request entry is pushed onto the DMA request entry queue of the requestor. This DMA request entry indicates, among other things, whether the access is to be a read or a write and the starting address to be accessed within the memory.

An arbiter block uses the TPS values of the various requesters to select DMA request entries off the various DMA request queues. If, for example, a given requestor is assigned a TPS value of two, then the arbiter block can select two DMA request entries off the queue (provided that there are two DMA entries on that queue). If there are less than two DMA request entries on the queue, then the arbiter block selects as many DMA entries as it can from the queue. In this way, the arbiter block selects DMA request entries from each queue. The resulting set of selected DMA request entries is called a "snapshot".

Once the snapshot is selected, the arbiter block selects DMA request entries from the snapshot in an order for servicing such that memory access overhead in accessing the memory is reduced or minimized. Before a DMA request entry is selected for servicing, however, a "service time out value" (STOV) stored in association with each queue is checked. The service time out value is a value that indicates a time after which a DMA request entry on the queue should be serviced irrespective of the fact that servicing the DMA request entry immediately would result in an order of servicing DMA request entries that does not result in the minimal memory access overhead. Accordingly, the arbiter block checks a timer to see if any of the service time out values has elapsed. If a queue is determined to have timed out, then the next DMA request entry selected out of the snapshot for servicing is the oldest DMA request entry off that queue.

Each queue has a register in which a time out value (TOV) is stored. When a DMA request entry is selected for servicing by the arbiter block, the current time as indicated by the timer is added to the time out value (TOV). The resulting time becomes the service time out value (STOV) for the queue.

Once all the DMA request entries of the snapshot have been selected for servicing, then the arbiter block selects the next snapshot of DMA request entries. When a DMA request entry is selected for servicing by the arbiter block, the DMA engine associated with the DMA request entry issues either reads and/or writes to the SDRAM via a memory interface unit (MIU). The MIU translates the reads and/or writes into memory commands understood by the particular memory used. If possible, the MIU supplies any necessary memory commands such as activate commands, column read commands, column write commands and precharge commands to the memory at the same time that data is being transferred either into or out of the memory. Providing activate, column read, column write and precharge commands in this fashion reduces memory access overhead.

Both the tokens per snapshot (TPS) value and the time out (TOV) value for each queue can be written by a processor. Increasing the tokens per snapshot (TPS) value of a queue increases the amount of memory access bandwidth allocated to the requester associated with the queue relative to other requesters. Decreasing the time out (TOV) value of a queue reduces the maximum amount of time between successive servicings of DMA request entries of the queue and therefore reduces memory access latency for the associated requester.

Although a token indicates a DMA request entry in the example described above, a token may represent other quantities that allow the TPS values to be used to allocate memory access bandwidth among numerous requesters. A token may, for example, represent an amount of time that a requester is allowed to use the access port of the memory. A token may, for example, represent an amount of data that the DMA engine of the requester is allowed to move either into or out of the memory.

Although all the DMA request entries in the example described above correspond to an equal amount of data movement, this need not be the case. In one example, DMA request entries can indicate different amounts of data movement. The amounts of data movement for the DMA request entries on the bottom of a queue are summed to determine how many of the DMA request entries on the bottom of the queue amount to the tokens per snapshot (TPS) value for the queue. Alternatively, DMA entries can indicate different amounts of time such that the amounts of time for the DMA request entries on the bottom of a queue are summed to determine how many of the DMA request entries on the bottom of the queue amount to the tokens per snapshot (TPS) value for the queue.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
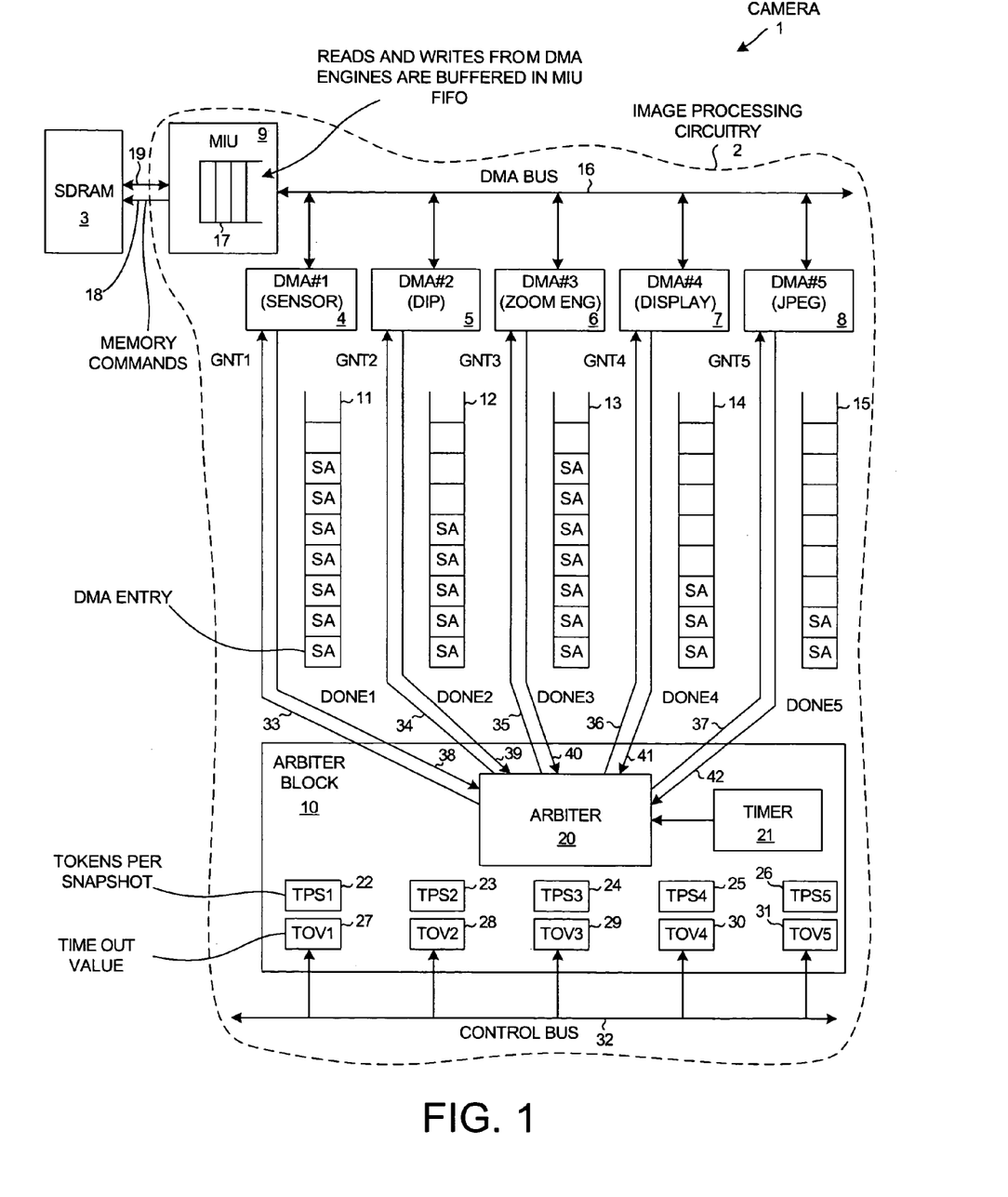
FIG. 1 is a diagram of a digital camera in accordance with one embodiment of the present invention.

FIG. 1 is a simplified block diagram of a digital camera 1 in accordance with one embodiment of the present invention. Camera 1 includes image processing circuitry 2 and a memory integrated circuit 3. Memory integrated circuit 3 is, for example, a single Synchronous Dynamic Random Access Memory (SDRAM) integrated circuit that stores image information.

Image processing circuitry 2 includes a plurality of requesting entities. Each of these requesting entities includes a DMA engine. FIG. 1 shows a DMA engine 4 that transfers raw image information output from an image sensor into the SDRAM 3, a DMA engine 5 of a digital image pipeline, a DMA engine 6 of a zoom engine, a DMA engine 7 that transfers information to a display such as an LCD display, and a DMA engine 8 of a JPEG compression engine. Image processing circuitry 2 further includes memory interface unit (MIU) 9, an arbiter block 10, and a plurality of queues 11-15. If a DMA engine accesses SDRAM 3, it does so through MIU 9. If, for example, DMA engine 4 were to read from SDRAM 3, then DMA engine 4 would issue a series of reads to MIU 9 over parallel DMA bus 16, when allowed to do so by the arbiter. The reads would be buffered in a first-in-first-out memory 17 within MIU 9. MIU 9 would then translate the reads into memory commands understood by SDRAM 3. For example, before a memory location can be read from SDRAM 3, SDRAM 3 may require that the memory bank containing the desired location be "activated." MIU 9 has the intelligence to know that the bank needs to be activated, and generates the necessary activate command that causes SDRAM 3 to activate the bank. The activate command, along with a row address for the subsequent memory access, is supplied onto a command bus 18 of SDRAM 3. After sending the activate command and the row address across command bus 18, MIU 9 sends an appropriate memory read command to SDRAM 3. A column address for the subsequent memory access is supplied along with the memory read command via command bus 18. SDRAM 3 returns the contents of the location indicated by the bank, row and column addresses to MIU 9 via a 16-bit wide parallel data bus 19. The command bus 18 and the data bus 19 together comprise a double data rate (DDR2) access port of SDRAM 3. All reads and writes to SDRAM 3 occur across this single access port. For more information on operation of the access port, see: JEDEC standard "DDR2 SDRAM Specification", JESD79-2A, January 2004, published by the JEDEC Solid State Technology Association, 2500 Wilson Boulevard, Arlington, Va. 22201 (the subject matter of which is incorporated herein by reference).

Arbiter block 10 includes an arbiter 20, a timer 21, a plurality of tokens per snapshot (TPS) registers 22-26, and a plurality of time out value (TOV) registers 27-31. There is one TPS register and one TOV register for each of the DMA engines. A processor (not shown) that controls operation of the various blocks of the image processing circuitry 2 can write to the various TPS and TOV registers via a parallel bus 32. In one embodiment, the processor is an ARM processor and bus 32 is an AMBA compliant 32-bit data bus.

When camera 1 is operating, the various requesting entities through their respective DMA engines push DMA request entries onto their respective queues. In the illustration, a DMA request entry is pushed onto the top of the already-present DMA entries in a queue. Each DMA request entry is either a request to read an amount of data from SDRAM or a request to write an amount of data to SDRAM. The amount of data is, in the present example, sixteen bytes for both a read request entry and a write request entry. Each DMA read request entry includes the starting address of the first byte to be read from SDRAM, as well as an indicator bit that indicates that the request is a read request. Each DMA write request entry includes a starting address of the first location in SDRAM into which the data is to be written, as well as an indicator bit that indicates that the request is a write request.

In the present example, DMA engine 4 pushes write requests onto queue 11. DMA engine 4, when given authorization to do so by arbiter block 10, moves raw image information coming from the image sensor (not shown) of the camera into SDRAM 3. DMA engine 5 is the DMA engine for the digital imaging pipeline (DIP). DMA engine 5 pushes DMA read request entries onto queue 12. When given authorization to do so by arbiter block 10, DMA engine 5 reads raw image information out of SDRAM 3 and transfers the information to the DIP. The DIP processes the image information. DMA engine 5 then pushes DMA write request entries onto queue 12 to be given authorization to write the output of the DIP back into SDRAM 3. Similarly, DMA engine 6 of the zoom engine pushes both read requests and write requests onto queue 13. DMA engine 7 pushes read requests onto queue 14. DMA engine 8 of the JPEG engine pushes read requests and write requests onto queue 15. FIG. 1 shows each of the queues 11-15 containing DMA request entries. The "SA" designation in FIG. 1 indicates the "starting address" portion of the DMA request entry.

Arbiter block 10 determines which of the DMA request entries will be granted first and therefore which of the DMA engines will be able to access SDRAM 3 first. After arbiter block 10 has determined which DMA request entry will be granted, it returns a grant signal to the appropriate DMA engine by a dedicated acknowledge signal line. No grant signals are supplied to the other DMA engines by their respective grant lines. The grant lines are indicated by numerals 33-37. The DMA engine that received the grant then retrieves the oldest DMA request on its queue. The oldest DMA request entry in each queue in the illustration of FIG. 1 is DMA request entry that is on the bottom of the queue. The DMA engine services this oldest DMA request entry as set forth above by issuing reads and/or writes to MIU 9. MIU 9 converts the reads and/or writes into memory commands appropriate for SDRAM 3 in accordance with the JEDEC standard referenced above.

When a DMA engine has serviced the oldest DMA request by issuing reads and/or writes to MIU 9, then the DMA engine sends a done signal to arbiter block 10 via a dedicated done signal line. The done signal lines are indicated by numerals 38-42. When arbiter block 10 receives the done signal, arbiter block 10 determines the next DMA request entry that will be granted.

Figure 2:
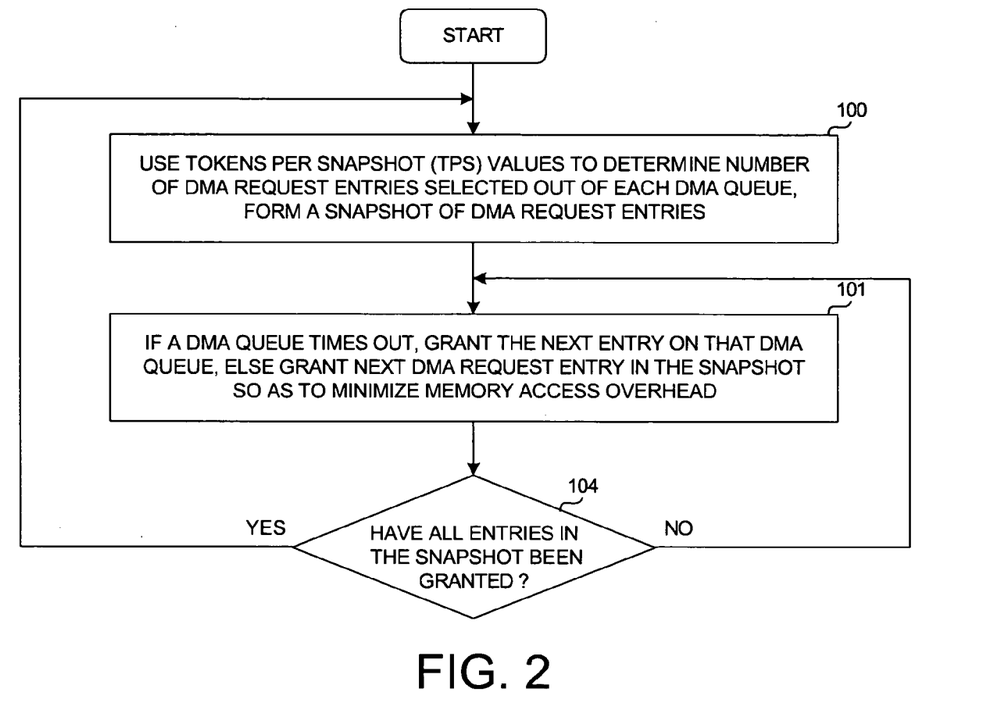
FIG. 2 is a simplified flowchart of the selection of DMA request entries for incorporation into a snapshot, and of the subsequent granting of the DMA request entries of the snapshot.

How arbiter block 10 determines which DMA request entry to grant is as follows and as set forth in FIG. 2. First (step 100 of FIG. 2), arbiter block 10 uses the tokens per snapshot (TPS) values for each of the queues to determine the number of DMA request entries to select out of each DMA queue. In the present example, a token per snapshot (TPS) number is a number in units of DMA request entries. A token per snapshot (TPS) number of two, for example, indicates two DMA request entries.

The set of selected DMA request entries is referred to here as a "snapshot" of DMA request entries. All the DMA request entries in the snapshot will be granted before any other DMA request entries are granted. Once a first snapshot of entries is granted, then a second snapshot of entries can be selected. Only after the first snapshot of DMA request entries is granted can the second snapshot of DMA request entries be granted. This process repeats. If a first DMA engine is to be allocated twice the amount of memory access bandwidth as a second DMA engine, then the first DMA engine should be allocated twice as many DMA entries per snapshot on average as the second DMA engine receives. The tokens per snapshot (TPS) value for this first DMA engine will therefore be set to be twice as large as the tokens per snapshot (TPS) value for the second DMA engine.

Figure 3:
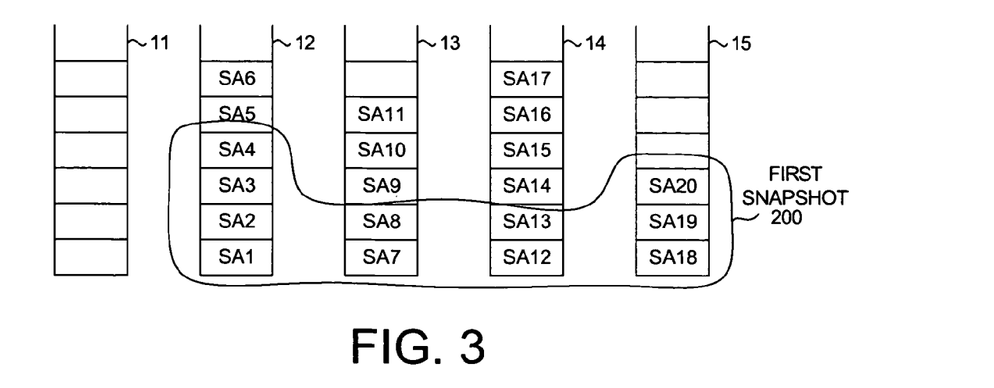
FIGS. 3, 6 and 7 illustrate the selection of two consecutive snapshots of DMA request entries.

FIG. 3 illustrates an example in which a first snapshot of DMA request entries is selected. The tokens per snapshot (TPS) value for each of the DMA engines 4-8 is 1, 4, 2, 2, and 6, respectively. There is no DMA request entry in queue 11. No DMA request entry is therefore selected from queue 11 even though the tokens per snapshot (TPS1) value for queue 11 is one. The first four DMA entries of queue 12 are selected, the first two DMA entries of queue 13 are selected, the first two DMA entries of queue 14 are selected, and the first three DMA entries of queue 15 are selected. Only three DMA entries of queue 15 are selected even though the TPS value for DMA engine 8 is six. This is because queue 15 only contains three DMA entries. The line 200 in FIG. 3 represents the DMA entries selected.

Once the first snapshot of DMA entries is selected, arbiter 20 selects a DMA request entry for granting (step 101 of FIG. 2) as follows. When a DMA request entry for a particular DMA engine has been granted (for example, as indicated by receipt of a done signal from the DMA engine), then a service time out value STOV (not shown) for the DMA engine is reset to be the current time as maintained by timer 21 plus the time out value TOV stored in the TOV register corresponding to the DMA engine. If the DMA engine does not have its next DMA request entry granted by the time the service time out value STOV arrives (as indicated by timer 21), then arbiter 20 selects the next DMA request entry to be granted to be the oldest DMA request entry for that DMA engine. Accordingly, arbiter 20 checks to see if any of the DMA queues have timed out (step 101 of FIG. 2).

If a DMA queue has timed out, then the next DMA entry for the timed out DMA queue is the next DMA request to be granted. If no DMA queue has timed out, then arbiter 20 selects the next DMA request entry (step 101 of FIG. 2) in the snapshot for granting so as to minimize SDRAM access overhead. Ways of minimizing SDRAM access overhead are explained in further detail below. If all the DMA request entries in the snapshot have not been granted (step 104 of FIG. 2), then the process of granting DMA request entries (step 101) continues until all DMA request entries in the snapshot have been granted. Once all the DMA request entries of the snapshot have been granted, processing returns to step 100 and a subsequent snapshot of DMA request entries is selected.

The order in which DMA request entries are granted within a snapshot is chosen such that memory access overhead is reduced or minimized. Certain orders of granting DMA request entries may result in more memory access overhead than others. Arbiter 20 has intelligence to be able to select an order of DMA request entry granting that reduces or minimizes this overhead for the particular type of memory being accessed. How this is done is described in connection with FIG. 4.

Figure 4:
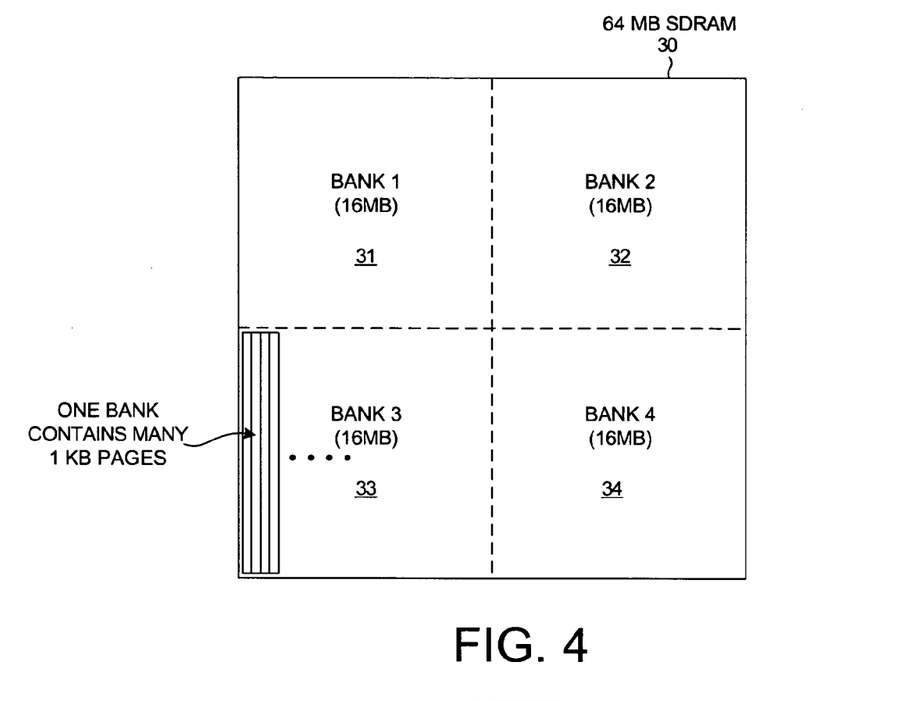
FIG. 4 illustrates one possible organization of an SDRAM integrated circuit.

FIG. 4 illustrates a typical SDRAM integrated circuit 30. SDRAM 30 is a 64 megabyte SDRAM, having four banks 31-34 of memory cells. Each bank has 16 megabytes of memory cells. Each bank is made up of many 1 k byte pages of memory cells. If a page in a first bank is being accessed, and then the next access is an access to the same page in the same bank, then the SDRAM integrated circuit does not require that the bank be either precharged or activated (unless there was some other intervening non-access related event, such as refresh). The second access can follow the first access without any special precharge command or any special activate command having to be sent to the SDRAM before the second access can be made.

If, however, the first access is of a page within a bank and the next access is of another page in the same bank, then the second page must be activated before the second access can be made. An activate command is sent to SDRAM 3 via command bus 18. Only after the second page has been activated, can the second access be performed. Accordingly, there is a memory access bandwidth penalty to performing this order of memory accesses.

If a first access is of a page within a first bank and the next access is of a page in another bank, then there may or may not be a memory access bandwidth penalty. Before the second access can be made, the second page must be activated. The SDRAM can, however, be instructed to perform this activation at an earlier time such that the activation to read or write delay is satisfied. If the activate command can be sent to the SDRAM over the command bus 18 (overlapping with the data transfer for some prior read or write access) prior to the activation to read or write time, then the memory access bandwidth penalty associated with this order of accessing is minimized. If, on the other hand, the activate command for the second access cannot be sent to the SDRAM early enough to satisfy the activation to read or write delay, then this delays the second access and constitutes a memory access bandwidth penalty. Arbiter 20 knows how to order the granting of the DMA entries within first snapshot 200 (see FIG. 3) such that the memory access bandwidth penalty associated with accessing SDRAM 3 is reduced or minimized.

In one embodiment, arbiter 20 examines the starting addresses of all the DMA entries of the snapshot while the DMA entries of the snapshot are still in their various queues. Arbiter 20 can remove any DMA entry in a queue and pass that DMA entry to its corresponding DMA engine even if the DMA entry is not the bottom-most (the oldest) DMA entry on that queue, provided that the DMA entry removed is within the snapshot. This allows arbiter 20 to remove the DMA entries of the snapshot and pass them to the DMA engines in any order such that the memory access bandwidth penalty is reduced or minimized.

Figure 5:
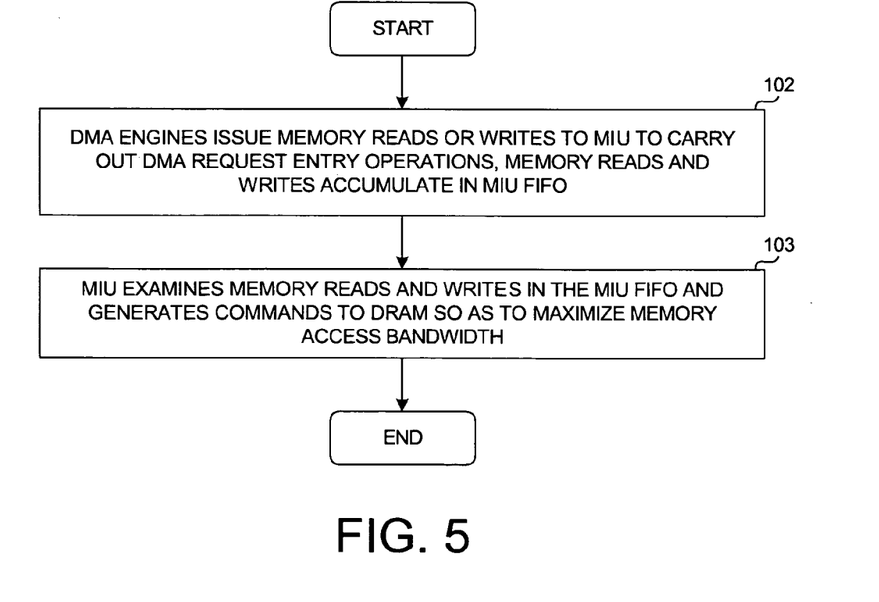
FIG. 5 is a simplified flowchart that illustrates how the granted DMA request entries pass through the MIU and are translated into memory commands by the MIU.

FIG. 5 is a flowchart that illustrates how granted DMA request entries are converted into commands that cause the memory accesses to occur. First (step 102 of FIG. 5), a DMA engine that receives a grant via its grant line issues a memory read or a memory write across DMA bus 16 as if the DMA engine were reading or writing from MIU 9. The memory reads and writes from the various DMA engines accumulate in the FIFO 17 within MIU 9. Next (step 103 of FIG. 5), MIU 9 examines the stream of memory reads and memory writes in FIFO 17 and pipelines any needed precharge and activate commands with prior memory accesses if it is possible to do so. Arbiter 20 and MIU 9 therefore work together to deal with the idiosyncrasies of the particular SDRAM used in order to reduce memory access overhead. MIU 9 converts the memory reads and memory writes in FIFO 17 into appropriate memory commands that are supplied to SDRAM 3 across command bus 18. MIU 9 also supplies data to SDRAM 3 via data bus 19 for memory writes and receives data from SDRAM 3 via data bus 19 for memory reads.

Figure 6:
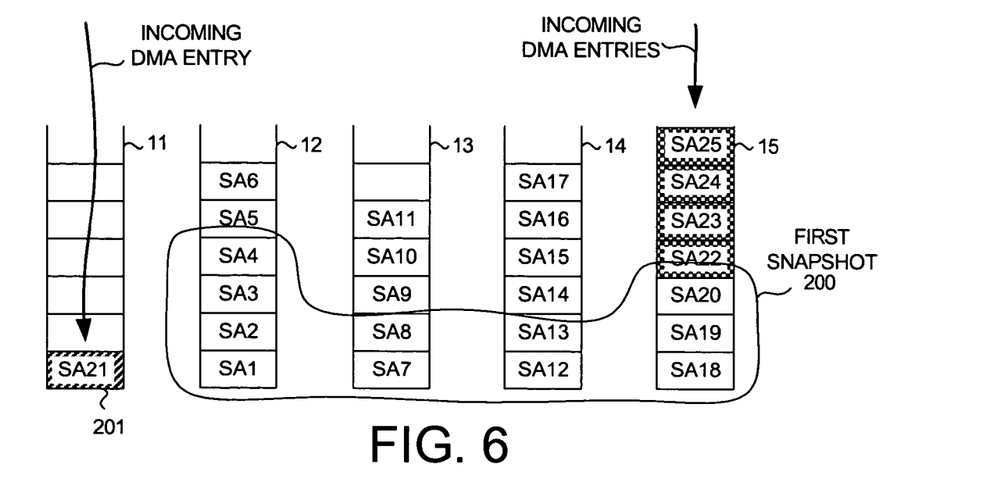

FIG. 6 illustrates DMA request entries being pushed onto queues 11 and 15 immediately after the first snapshot 200 of DMA entries of FIG. 3 has been selected. DMA request entry 201 is a new DMA request entry pushed onto queue 11. In this example, there are also new DMA request entries pushed onto queue 15. As set forth above, all entries of the first snapshot are granted before any of these newly pushed DMA request entries is selected for incorporation into a snapshot.

Figure 7:
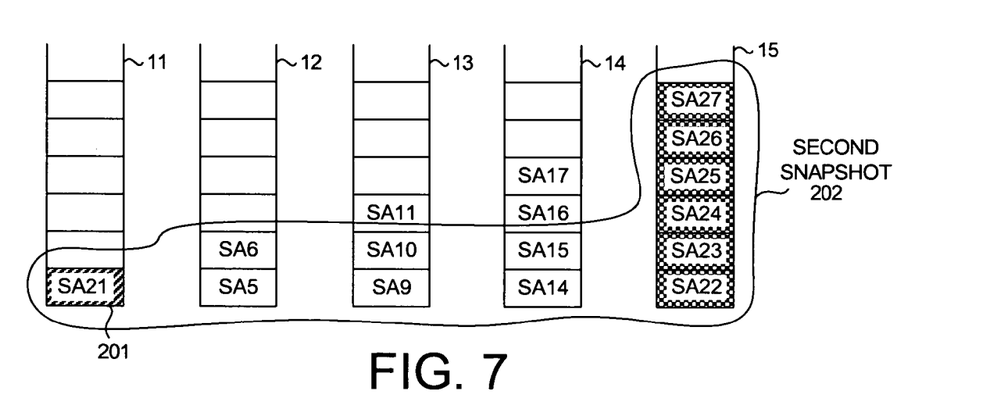

FIG. 7 illustrates a subsequent step in which a second snapshot 202 of DMA request entries is taken. Again, arbiter 20 uses the tokens per snapshot (TPS) values in registers 27-31 to determine how many DMA request entries, if present, to select from each queue. The tokens per snapshot value TPS1 for DMA engine 4 is one, so the newly added DMA entry 201 is selected for incorporation into the second snapshot. The tokens per snapshot value TPS2 for DMA engine 5 is four, but there are only two DMA entries on queue 12. Only two DMA entries from queue 12 are therefore selected. The tokens per snapshot TPS5 for DMA engine 8 is six, and there are six DMA entries on queue 15, so six DMA entries are selected from queue 15. The selected DMA request entries are shown enclosed in line 202 in FIG. 7.

Figure 8:
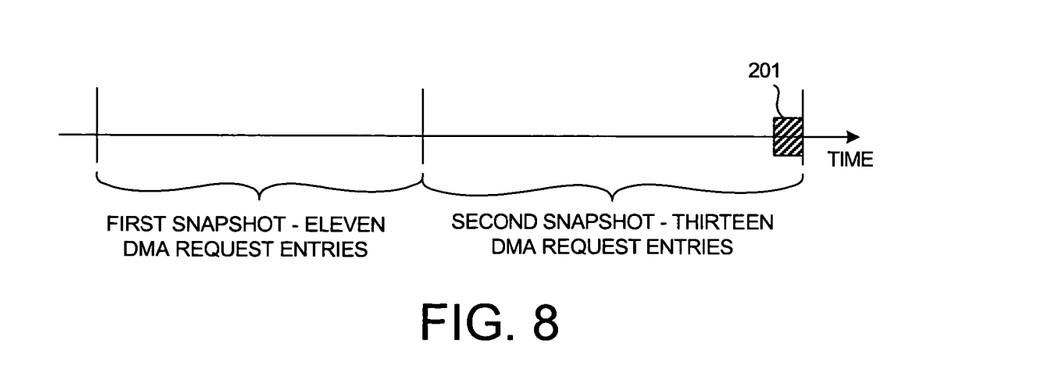
FIG. 8 illustrates a potential latency problem associated with the example of FIGS. 3, 6 and 7.

FIG. 8 illustrates a latency issue that can appear in the situation of FIGS. 3, 6 and 7. The maximum amount of time to grant a DMA entry from queue 11 is approximately two snapshots worth of memory access time. This occurs in the situation in which a DMA request entry such as DMA request entry 201 arrives shortly after the selection of the entries for the first snapshot, and where the DMA request entry 201 ends up to be the last DMA request entry granted in the second snapshot. FIG. 8 illustrates such a situation.

If the latency associated with the situation of FIG. 8 cannot be tolerated by DMA engine 4, then the time out value TOV1 for queue 11 is set such that DMA queue 11 will time out at an earlier time. DMA engine 4 that transfers raw image information from the image sensor and places that raw image information into SDRAM 3 may, for example, only be able to tolerate a relatively small amount of latency when it tries to transfer data to SDRAM 3. If DMA engine 4 is made to wait too long when it is trying to write raw image information into SDRAM 3, then the raw image information may be overwritten thereby resulting in a loss of raw image information. This latency problem is to be avoided.

Figure 9:
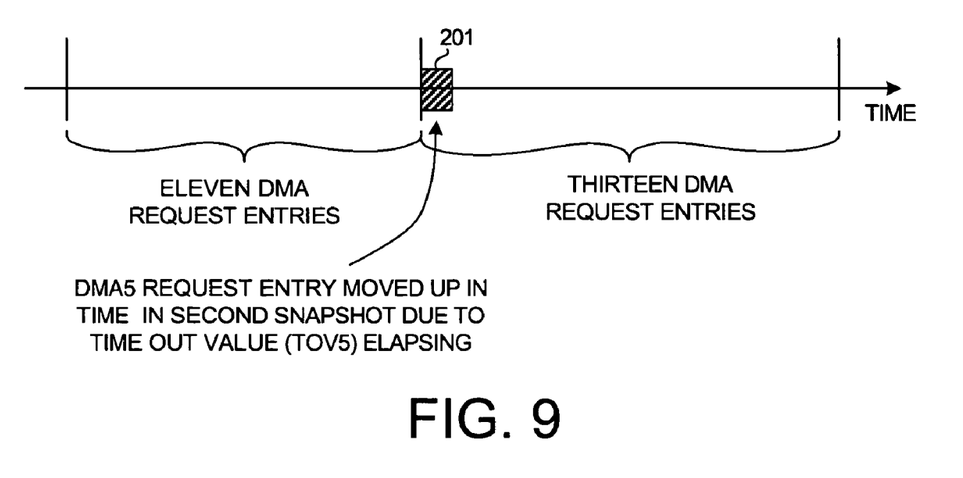
FIG. 9 illustrates how the latency problem illustrated in FIG. 8 may be solved in accordance with an embodiment of the present invention.

FIG. 9 illustrates an example in which the time out value TOV1 is set to be smaller than the amount of time it takes for the granting of eleven DMA requests (the eleven DMA requests of the first snapshot). Accordingly, because an entry off the bottom of queue 11 has not been granted for this amount of time, DMA queue 11 times out during the granting of the first snapshot of DMA request entries. When the second snapshot of DMA request entries is selected, and selection of which DMA request entries in the second snapshot to grant begins, the DMA request entry 201 is selected for granting before other DMA request entries of the second snapshot the queues of which have not timed out. Note that DMA request entry 201 in FIG. 9 is granted at the beginning of the granting of the thirteen DMA request entries of the second snapshot, rather than at the end of the granting of the thirteen DMA request entries of the second snapshot at illustrated in FIG. 8.

Although the present invention has been described in connection with certain specific embodiments for instructional purposes, the present invention is not limited thereto. The technique of selecting a snapshot of DMA request entries is not limited to use in digital cameras, but rather is a general-purpose technique usable to control access to a memory. Although the entities making requests to access the memory may be DMA engines in some embodiments, other types of entities can be requesting entities. Processors and specific-purpose state machines can be requesting entities. Although the invention is described in connection with controlling access to one memory integrated circuit, the invention is usable to control access to multiple integrated circuits. The memory to which access is controlled need not be a separate integrated circuit from the arbiter circuitry, but rather both the arbiter circuitry and the memory can be integrated on the same integrated circuit. Although bus 16 is illustrated as a bus wherein a single group of bus conductors carry information from a selected one of the DMA engines 4-8 to MIU 9, this need not be the case. DMA bus 16 need not have conductors over which signals pass in a bidirectional fashion. For example, the outputs of DMA engines 4-8 can be supplied to the data input leads of a multiplexer and the select input leads of the multiplexer can be controlled by the arbiter to couple a selected one of the DMA engines 4-8 to MIU 9. Although the technique of using snapshots to allocate memory access bandwidth is described above in connection with a digital camera, the technique is applicable in any system involving a memory. Accordingly, various modifications, adaptations, and combinations of various features of the described embodiments can be practiced without departing from the scope of the invention as set forth in the claims.

What is claimed is:

1. A camera, comprising:
a memory that stores image information;
a first DMA engine;
a first queue for storing DMA request entries for the first DMA engine;
a circuit that stores a first tokens per snapshot number (TPS1);
a second DMA engine;
a second queue for storing DMA request entries for the second DMA engine, wherein each DMA request entry in the first queue and each DMA entry in the second queue indicates an associated amount of data movement;
a circuit that stores a second tokens per snapshot number (TPS2); and
an arbiter that selects a first snapshot of DMA request entries having a first number of DMA request entries from the first queue and a second number of DMA request entries from the second queue, wherein TPS1 is used to determine the first number, and wherein TPS2 is used to determine the second number, and wherein the arbiter determines an order that the DMA request entries in the first snapshot are to be serviced by the first and second DMA engines.

2. The camera of claim 1, further comprising:
an image sensor, wherein the first DMA engine moves raw image data received from the image sensor into the memory.

3. The camera of claim 1, further comprising:
a zoom engine; and
a compression engine, wherein the first DMA engine moves data between the zoom engine and the memory, and wherein the second DMA engine moves data between the compression engine and the memory.

4. The camera of claim 1, wherein the arbiter selects a second snapshot of DMA request entries, and wherein all the DMA request entries of the first snapshot are serviced before any DMA request entries of the second snapshot are serviced.

5. The camera of claim 1, wherein each of the DMA request entries includes an address, and wherein the arbiter determines the order by examining addresses of DMA request entries of the first snapshot, wherein there are multiple different possible orders of accessing said memory some of which have higher memory overhead than others, and wherein the arbiter orders the DMA request entries of the first snapshot so as to minimize memory access overhead.

6. The camera of claim 1, further comprising:
a memory interface unit (MIU), wherein the first and second DMA engines issue memory access requests to the MIU in an order, the order of the memory access requests being the order that the DMA request entries in the first snapshot are serviced.

7. The camera of claim 6, wherein the MIU converts the memory access requests into corresponding memory commands, the memory commands being supplied to the memory.

8. The camera of claim 7, wherein the memory interfaces with the MIU via a command bus and a data bus, and wherein the MIU issues commands to the memory over the command bus at the same time that data is tranferred btween the MIU and the memory across the data bus.

9. The camera of claim 1, wherein the memory is a synchronous dynamic random access memory (SDRAM) integrated circuit, and wherein the first DMA engine, the first queue, the circuit that stores TPS1, the second DMA engine, the second queue, the circuit that stores TPS2, and the arbiter are not part of the SDRAM integrated circuit.

10. The camera of claim 1, wherein the first tokens per snapshot number (TPS1) is a number that represents an amount of time.

11. The camera of claim 1, wherein the first tokens per snapshot number (TPS1) is a number that represents an amount of data.

12. The camera of claim 1, wherein the first tokens per snapshot number (TPS1) is a number of DMA request entries.

13. The camera of claim 1, wherein the arbiter has a timer for determining whether a period of time associated with the first DMA engine has elapsed, and if the period of time has elapsed then the arbiter determines that a DMA request of the first snapshot from the first queue is to be serviced before any other DMA request entries of the first snapshot are serviced.

14. The camera of claim 1, wherein after the first snapshot of DMA request entries has been selected the arbiter selects a second snapshot of DMA request entries, and wherein the number of DMA request entries in the first snapshot is identical to the number of DMA request entries in the second snapshot.

15. The camera of claim 1, wherein after the first snapshot of DMA request entries has been selected the arbiter selects a second snapshot of DMA request entries, and wherein the number of DMA request entries in the first snapshot is different from the number of DMA request entries in the second snapshot.

16. The camera of claim 1, wherein the arbiter successively selects snapshots of DMA requests entries, and wherein each snapshot of DMA request entries is serviced in a window of time, and wherein the windows of time of each of the snapshots is an identical amount of time.

17. The camera of claim 1, wherein the arbiter successively selects snapshots of DMA requests entries, and wherein each snapshot of DMA request entries is serviced in a window of time, and wherein the windows of time of the various snapshots are differnet amounts of time.

18. A method of allocating memory access bandwidth among a plurality of requesting entities in a digital camera, each of the requesting entities having a queue for storing DMA request entries, each DMA request entry being a request to perform an access of a memory integrated circuit in the digital camera, wherein each of the requesting entities has a tokens per snapshot (TPS) value, the method comprising:
 (a) selecting a snapshot of DMA request entries by selecting, for each queue, a number of DMA request entries based on the TPS value for the requesting entity associated with the queue;
 (b) servicing the DMA request entries in the snapshot in an order that reduces memory access overhead associated with performing the memory accesses requested by the DMA request entries in the snapshot; and
 (c) repeating steps (a) and (b).

19. The method of claim 18, wherein each tokens per snapshot (TPS) value is a number of tokens, and wherein a token represents one DMA request entry.

20. The method of claim 18, wherein each tokens per snapshot (TPS) value is an indication of an amount of data movement, and wherein each DMA request entry comprises an indication of an amount of data movement.

21. The method of claim 18, wherein each tokens per snapshot (TPS) value is an indication of an amount of time.

22. The method of claim 18, wherein one of the requesting entities is a compression engine.

23. The method of claim 18, wherein no DMA request entries are selected in (a) from a queue if there are no DMA request entries in the queue.

24. The method of claim 18, wherein the memory integrated circuit is a dynamic random access memory (DRAM) integrated circuit, and wherein the memory access overhead reduced in (b) includes overhead associated with performing a refresh operation on the DRAM integrated circuit.

* * * * *

UNITED STATES PATENT AND TRADEMARK OFFICE
CERTIFICATE OF CORRECTION

| | | |
|---|---|---|
| PATENT NO. | : 7,392,330 B2 | Page 1 of 1 |
| APPLICATION NO. | : 10/884081 | |
| DATED | : June 24, 2008 | |
| INVENTOR(S) | : Darryl G. Weatherspoon | |

It is certified that error appears in the above-identified patent and that said Letters Patent is hereby corrected as shown below:

Column 10, line 31, the characters "an-order" should be changed to --an order--.

The text from column 10, lines 10-33, should now read:

1. A camera, comprising:
a memory that stores image information;
a first DMA engine;
a first queue for storing DMA request entries for the first DMA engine;
a circuit that stores a first tokens per snapshot number (TPS1);
a second DMA engine;
a second queue for storing DMA request entries for the second DMA engine, wherein each DMA request entry in the first queue and each DMA entry in the second queue indicates an associated amount of data movement;
a circuit that stores a second tokens per snapshot number (TPS2); and
an arbiter that selects a first snapshot of DMA request entries having a first number of DMA request entries from the first queue and a second number of DMA request entries from the second queue, wherein TPS1 is used to determine the first number, and wherein TPS2 is used to determine the second number, and wherein the arbiter determines an order that the DMA request entries in the first snapshot are to be serviced by the first and second DMA engines.

Signed and Sealed this

Second Day of September, 2008

JON W. DUDAS
*Director of the United States Patent and Trademark Office*